United States Patent
Robinson

(10) Patent No.: US 7,840,470 B2
(45) Date of Patent: Nov. 23, 2010

(54) RETIREMENT PLANNING SYSTEM AND METHOD

(75) Inventor: Charles D. Robinson, River Hills, WI (US)

(73) Assignee: The Northwestern Mutual Life Insurance Company, Milwaukee, WI (US)

( * ) Notice: Subject to any disclaimer, the term of this patent is extended or adjusted under 35 U.S.C. 154(b) by 0 days.

(21) Appl. No.: 12/245,418

(22) Filed: Oct. 3, 2008

(65) Prior Publication Data

US 2009/0030740 A1    Jan. 29, 2009

Related U.S. Application Data

(63) Continuation of application No. 11/029,589, filed on Jan. 5, 2005, now abandoned.

(51) Int. Cl.
*G06Q 40/00*    (2006.01)

(52) U.S. Cl. .......................... 705/36 R; 705/4

(58) Field of Classification Search .............. 705/35–42
See application file for complete search history.

(56) References Cited

U.S. PATENT DOCUMENTS

| | | | |
|---|---|---|---|
| 6,012,043 A * | 1/2000 | Albright et al. ........... 705/36 R |
| 6,611,807 B1 * | 8/2003 | Bernheim et al. ......... 705/36 R |
| 6,684,190 B1 * | 1/2004 | Powers et al. ............. 705/36 R |
| 7,398,241 B2 * | 7/2008 | Fay et al. .................. 705/36 R |
| 2002/0073005 A1 * | 6/2002 | Welnicki et al. .............. 705/35 |
| 2002/0138386 A1 | 9/2002 | Maggioncalda et al. |
| 2002/0143680 A1 * | 10/2002 | Walters et al. ................. 705/36 |
| 2005/0060251 A1 * | 3/2005 | Schwartz et al. .............. 705/35 |
| 2006/0089862 A1 * | 4/2006 | Anandarao et al. ............. 705/4 |
| 2007/0239572 A1 * | 10/2007 | Harris et al. .................. 705/35 |
| 2008/0010086 A1 * | 1/2008 | Skelly et al. .................... 705/2 |

OTHER PUBLICATIONS

Fidelity Investments Offers Free Retirement Planning Software on Web Site, Apr. 19, 1997, Business Wire.*
Kaufman, Ted, Be Prepared for a Retirement that goes through phases; business forum; Jul. 14, 2004, Virginian-Pilot, p. D.3.*
"Fidelity Investments Offers Free Retirement Planning Software on Web Site", Apr. 19, 1997, Business Wire.*
Kaufman,Ted, Be Prepared for a Retirement that goes through phases; business forum; Jul. 14, 2004, Virginian-Pilot, p. D.3.*
MFS Investment Management; MFS Retirement Survey Shows Income Planning Needed for Pre-retirees. (Mar. 2008). Business & Finance Week,613. Retrieved Jul. 1, 2010.*

(Continued)

*Primary Examiner*—Ella Colbert
*Assistant Examiner*—Mohammad Z Shaikh
(74) *Attorney, Agent, or Firm*—Foley & Lardner LLP

(57) ABSTRACT

A computer-implemented retirement planning system comprises data collection logic, modeling logic, and report generation logic. The data collection logic is configured to receive data pertaining to an individual planning for retirement. The retirement modeling logic is configured to process the data to generate parameters of a retirement plan. The retirement plan comprises a retirement income arrangement in which the amount of inflation-adjusted retirement income (from sources other than long term care insurance and health insurance) is larger during early years of the retirement plan and decreases as the maximum life expectancy of the individual is reached. The report generation logic being configured to generate a retirement plan report describing the retirement income arrangement.

22 Claims, 13 Drawing Sheets

OTHER PUBLICATIONS

John Morgan. (Oct. 2007). Retirement Income: A Work in Progress: Experts Advise New Approach to Retirement Income. Money Management Executive,1. Retrieved Jul. 1, 2010.*

Michael D Everett, & Murray S Anthony. (Jun. 2003). A stages model for planning retirement income distribution. Journal of Financial Planning.*

Schieber, Sylvester. Benefits Quarterly. Brookfield: Fourth Quarter 2004. vol. 20, Iss. 4; p. 27, 13 pgs.*

Charles D. Robinson, "A Phased-Income Approach to Retirement Withdrawals," FPA Journal, 16 pages.

Bengen, William P.,"Determining Withdrawal Rates Using Historical Data," *Journal of Financial Planning*, Oct. 1994, 9 pages.

Brown, Jeffrey R. et al., "Joint Life Annuities and Annuity Demand by Married Couples," *The Journal of Risk and Insurance*, 67, 4: 200, Dec. 2000, 29 pages.

Brown, Dr. Jeffrey, "The New Retirement Challenge," *Policy White Paper, Americans for a Secure Retirement*, www.paycheckforlife. org. Sep. 2004, 20 pages.

Fronstin, Paul et al., "Health Care Expenses in Retirement and the Use of Health Savings Accounts," *EBRI Issue Brief #271*, Jul. 2004: 8, 32 pages.

Grangaard, Paul, *The Grangaard Strategy: Invest Right During Retirement* (New York: Berkley Publishing Group, 2003), 268 pages.

Guyton, Jonathon, "Decision Rules and Portfolio Management for Retirees: Is the 'Safe' Initial Withdrawal Rate Too Safe?" *Journal of Financial Planning*, Oct. 2004, 7 pages.

Lubinski, Philip G and WEALTH2K, "The Income for Life Model, An Investment Strategy with the Objective of Providing Inflation-Adjusted Income for Life," Demo Presentation, 2005, 24 pages (48 powerpoint slides).

"Many Americans Lack Confidence in Ability to Retire Comfortably," the *Wall Street Journal*, Sep. 26, 2005, 7 pages.

Mincer, Jilian, "Experts Disagree on Retiree Health-Cost Estimate," *Wall Street Journal*, Mar. 11-12, 2006: B4, 2 pages.

Roame, Chip, Tiburon Strategic Advisors, 2005, 4 pages.

Robinson, Charles D., CFP, "A Phased-Income Approach to Retirement Withdrawals: A New Paradigm for a More Affluent Retirement," *FPA Journal*, Mar. 2007, 16 pages.

Selling Point—The Three Phases of Retirement, Lincoln Benefit Life Company, Dec. 2, 2002, Copyright 2002 Allstate Insurance Company, 1 page.

Stein, Michael K., CFP, *The Prosperous Retirement Guide to the New Reality*, Copyright 1998 EMSTCO Press, 320 pages.

Office Action for U.S. Appl. No. 11/811,453, mail date May 26, 2010, 26 pages.

* cited by examiner

DETERMINING RETIREE'S MINIMUM INCOME NEEDS BEYOND AGE 85 IN THE HISTORICAL "WORST CASE SCENARIOS":

You will face a potential range of widely different outcomes in retirement. If we examine Rolling Historical Periods since 1926, the majority of potential outcomes would allow a retiree to enjoy a relative consistent stream of real income, in some cases even greater income, as they pass through the initial stages of retirement. However, there were about 5% of the periods where negative factors such as an economic downturn and/or high inflation created "Worst Case Scenarios". In order to plan for these "Worst Case" periods, it will be necessary to either (A) decrease the amount of income you consume in the early periods of retirement or (B) decrease your level of spending in the post Age 85 period. The following questions are designed to determine how to balance these income needs in retirement.

A. In the "Passive Phase" of retirement (Ages > 85), would you anticipate spending the same amount of income on the following as you did during the "Active Phase" (Ages 65-75) and the "Slowing Down Phase" (Ages 75-85)?

1. Discretionary Travel      {Increase, Decrease, Stay the same} {How Much?}
2. Entertainment              {Increase, Decrease, Stay the same} {How Much?}
3. Recreational Activities    {Increase, Decrease, Stay the same} {How Much?}
4. Dining Out                 {Increase, Decrease, Stay the same} {How Much?}
5. Housing expenses           {Increase, Decrease, Stay the same} {How Much?}

B. The odds of one person living beyond Age 85 are pretty good, but the odds of both spouses living beyond Age 85 are relatively low. How would the death of your spouse affect your spending pattern in the post Age 85 Period? {Increase, Decrease, Stay the same} {How Much?}

DETERMINING RETIREE'S MINIMUM INCOME NEEDS BEYOND AGE 85 IN THE HISTORICAL "WORST CASE SCENARIOS" (CONT.)

C. If you were to experience another 1929 Depression during the early years of your retirement, would you be willing to alter your pattern of spending in the post Age 85 "Passive Phase", if it allowed you to increase spending from Ages 65-75 during the "Active Phase"?   {Yes, No}

D. What percentage of pre-retirement Net After Tax Spendable Income would be minimally viable for you in the Post Age 85 "Passive Phase" in the event you experience one of the historical "Worst Case Scenarios" early in your retirement?  {_____%}

FIG. 7

DETERMINING RETIREE'S RISK TOLERANCE FOR RECEIVING LESS THAN THE HISTORICAL "WORST CASE SCENARIO".

A. In the event unforeseen future economic events created a shortfall in your income beyond Age 85, would you have other sources of income?
   1. Cash Value Life Insurance {Yes, No}  If "yes," how much? {$_____}
   2. Reverse Mortgage on Real Estate {Yes, No}  If "yes," what is present value? {$_____}
   3. Social Security {Yes, No}  If "yes," how much? {$_____}
   4. Other Assets Not Used To Produce Retirement Income {Yes, No}  If "yes," what is present value? {$_____}

B. Many experts believe that the impact of inflation is not fully realized by retirees.  In calculating the effects of inflation on your real retirement income, should we utilize?   {1, 2, 3}
   1. The full effect of inflation
   2. Inflation Less One Per Cent (1%)
   3. Inflation Less One and One Half Per Cent (1 ½%)

C. Have you made provisions for insurance to cover medical expenses?
   1. Long Term Nursing Care {Yes, No}
   2. Medical Care {Yes, No}
   3. Prescription Drugs {Yes, No}

FIG. 8

RETIREMENT PLANNING SYSTEM AND METHOD

CROSS-REFERENCE TO RELATED PATENT APPLICATIONS

This application is a continuation of U.S. application Ser. No. 11/029,589, filed Jan. 5, 2005, which is incorporated herein by reference in its entirety.

BACKGROUND

The present invention relates generally to the field of retirement investment planning systems and methods.

Different individuals have different financial goals for retirement. For many people, an important financial goal during retirement is to have "income forever." That is, such individuals wish to avoid running out of money while they are still alive. As part of this desire, individuals want to have enough money to pay long term care costs and health care costs during later years in life. At the same time, many people want to have money for leisure spending, particularly in the early years of retirement, to enjoy some of the things that they did not have the time to enjoy previously, such as traveling. Also, many people want to have money to pass on to heirs and/or charitable organizations.

Individuals may have different tolerances for different types of risk in connection with different ones of the above goals. For example, the retiree may be relatively risk averse in connection with the retiree's desire to avoid running out of money. On the other hand, in order to have the potential of greater investment returns, the retiree may be willing to live with more risk in connection with wealth to be passed on to heirs and/or charitable organizations. Different levels of risk tolerance have different implications for the types of investments that a retiree should be holding and the return on investment which the retiree can reasonably expect.

Planning for retirement is difficult due to the many seemingly conflicting goals and risks that a retiree faces. Retirees may have accumulated retirement savings well in excess of what is needed to provide for basic needs spending, but may be overly-cautious about spending it too quickly during early years of retirement, preventing them from fully enjoying the traveling and other activities that are supposed to be part of the golden years of life. Maximizing the benefit that can be derived from a given set of retirement assets can be difficult, particularly while taking into account a given retiree's tolerance for risk.

An ongoing need exists for retirement planning tools which help maximize the benefit that can be derived from a given set of retirement assets, while also taking into account a given retiree's tolerance for risk. An ongoing need also exists for retirement planning tools which allow for an accurate identification of the goals of the retiree and associated risks, which help distinguish between different investment goals, and/or which help plan more efficiently for each. Although certain advantages of systems and methods which incorporate the teachings herein are described, it will be appreciated that the teachings herein may be used to implement other systems and methods which do not exhibit some or any of these advantages, but rather which exhibit other advantages.

SUMMARY

One exemplary embodiment relates to a computer-implemented retirement planning system. The system comprises data collection logic, modeling logic, and report generation logic. The data collection logic is configured to receive data pertaining to an individual planning for retirement. The retirement modeling logic is configured to process the data to generate parameters of a retirement plan. The retirement plan comprises a retirement income arrangement in which the amount of inflation-adjusted retirement income (from sources other than long term care insurance and health insurance) is larger during early years of the retirement plan and decreases as the maximum life expectancy of the individual is reached. The report generation logic is configured to generate a retirement plan report describing the retirement income arrangement.

Another exemplary embodiment relates to a computer-implemented retirement planning method. The method comprises receiving user inputs indicating a level of income an individual considers to be a worst case scenario basic needs level of income. The method further comprises receiving user inputs indicating the individual's tolerance for risk in connection with the prospect that actual retirement income during a final phase of retirement may be less than the basic needs level of income. The method further comprises generating a retirement plan based on (1) the worst case scenario basic needs level of income and (2) the individual's tolerance for risk in connection with the prospect that the actual retirement income during the final phase of retirement may be less than the worst case scenario basic needs level of income.

BRIEF DESCRIPTION OF THE DRAWINGS

FIGS. 6-8 are screen displays that may be provided by data collection logic of FIG. 1 to elicit information from a user.

DETAILED DESCRIPTION OF EXEMPLARY EMBODIMENTS

Figure 1:
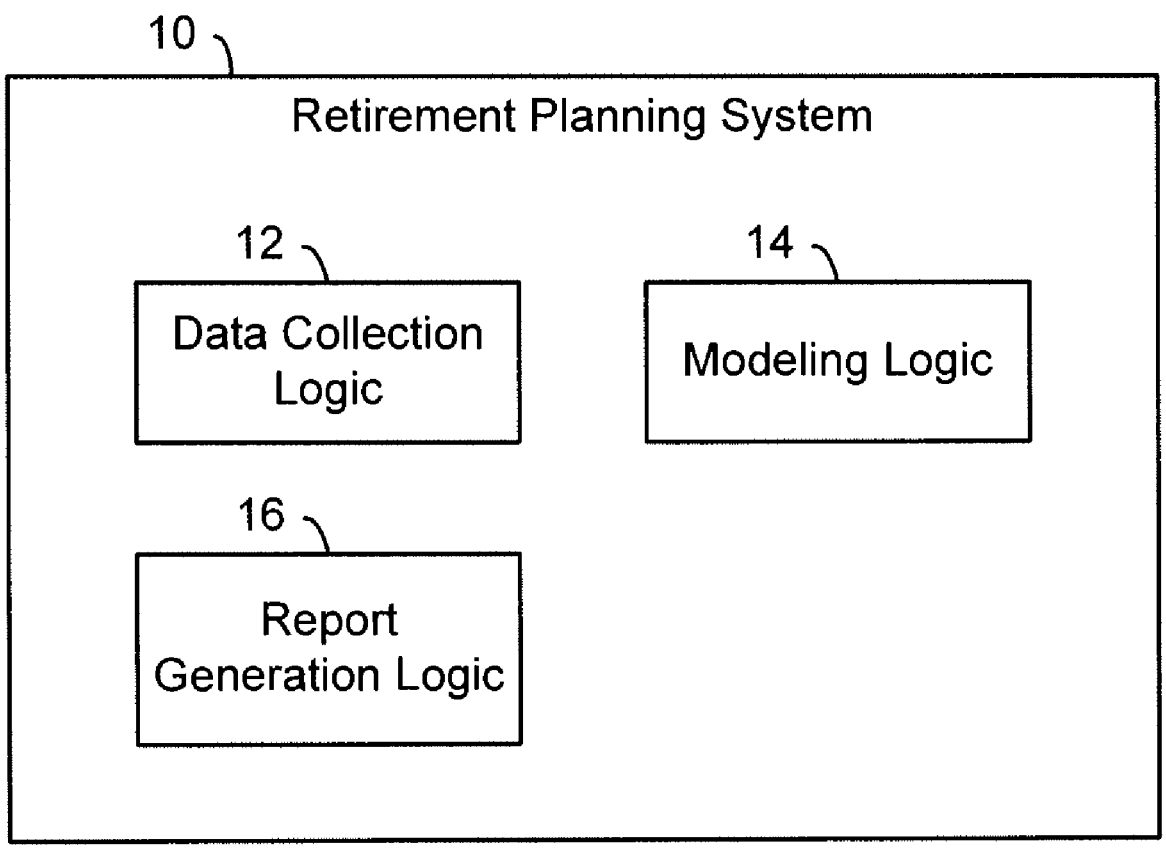
FIG. 1 is a retirement planning system according to an exemplary embodiment.

Referring to FIG. 1, a retirement planning system 10 is shown. System 10 may be implemented, for example, using a programmed computer (e.g., a desktop computer, laptop computer, etc.) provided with program modules including routines, programs, objects, components, data structures, etc. that perform particular tasks described herein. Planning system 10 may be accessed locally or remotely (e.g., logic for planning system 10 may be stored and accessed locally, or may be provided on a server and made available to a user remotely via the World Wide Web). The program modules may be custom programmed or may be based on commercially available software (e.g., a spreadsheet program operating on a data file which incorporates the teachings provided herein).

Retirement planning system 10 may be used to help a retiree plan for retirement. Herein, the term "retiree" is used to refer to any person planning for retirement (i.e., regardless whether that person is already retired). A retiree may plan for retirement alone or with the assistance of a third party, such as a financial planner, investment adviser, other representative of a financial services company, and so on.

Retirement planning system 10 comprises data collection logic 12, modeling logic 14, and report generation logic 16. Data collection logic 12 are used to receive input from the retiree (e.g., directly, by way of a financial planner or investment adviser, etc.). Data collection logic 12 may comprise screen displays and data collection fields that are presented to the user in the form of a questionnaire. For example, data collection logic 12 may be used to collect financial data concerning the retiree (e.g., existing assets, sources of income including other retirement plans, spending habits, budgets, and so on). Data collection logic 12 may also be used to collect data concerning the retiree's goals (e.g., how much does the retiree wish to give to charities, how much does the retiree wish to leave to heirs, and so on). Data collection logic 12 may also be used to collect data concerning the retiree's tolerance for risk. For example, data collection logic 12 may configured to pose a series of questions to a borrower that elicit information which may be used to evaluate the retiree's tolerance for risk. Such information may be obtained by posing a series of quantitative and/or qualitative questions to the borrower. Examples of such questions are described in detail below.

Modeling logic 14 is used to process the data provided by the retiree and collected by data collection logic 12. For example, modeling logic 14 may be used to convert data provided by the user into data useable to generate potential retirement plans. For example, as previously noted, data collection logic 12 may pose qualitative questions asking the retiree to select from predefined answer choices. Modeling logic 14 may comprise equations and weighting coefficients useable to generate a composite profile of the retiree's answers to certain types of questions. For example, a scoring algorithm may be used to assign weightings to different questions/answers and to generate numeric scores summarizing the user's answers which may be used in downstream calculations. For example, different scores may be generated reflecting the retiree's tolerance for different respective types of risk. Modeling logic 14 may then be used to use the processed data to generate different potential retirement plans for user comparison and selection. The different potential retirement plans may reflect different assumptions about investment performance, different mixes of investments, different risk tolerance levels, different spending patterns, and so on.

Report generation logic 16 is used to present output of modeling logic 14 to the user. Report generation logic 16 may be used to generate reports to provide the retiree. For example, report generation logic 16 may be used to generate reports presenting the retiree with the different potential retirement plans generated by the modeling logic 14. Such reports may be presented to a user via a computer display screen, presented electronically via the internet, presented in hardcopy format using a printer, and so on. For example, such reports may include graphs of the type shown in FIG. 4 and FIGS. 9-12. Such reports may be configured to include cautionary information, such as warnings that no investment strategy can guarantee a profit or protect against loss, limitations of the information presented (e.g., that the graphs do not account for taxes and investment costs which would reduce performance results), and so on. Data collection logic 12, modeling logic 14, and report generation logic 16 are described in greater detail below.

Figure 2:
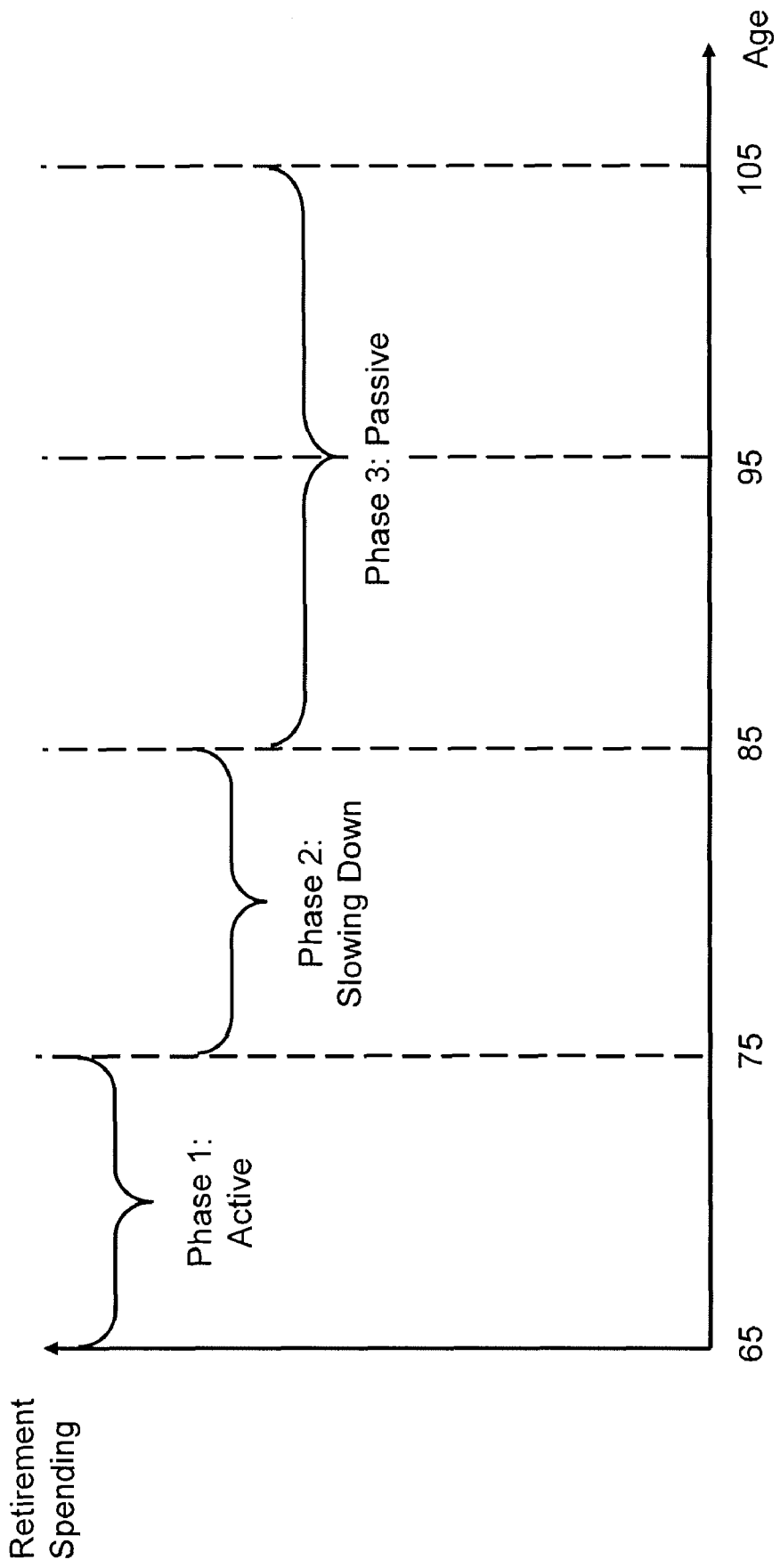
FIG. 2 is a chart showing spending habits taken into consideration by the retirement planning system of FIG. 1.

Referring now also to FIG. 2, retirement planning system 10 is configured to view retirement as comprising a number of phases. In FIG. 2, three phases are shown, although it will be appreciated that a different number of phases may be used. The three phases in FIG. 2 comprise an active phase 20, a slow down phase 22, and a passive phase 24. During active phase 20, the retiree is assumed to be more active, enjoying activities such as travel, entertainment, sports, and so on. As a result, lifestyle spending is at its highest. Herein, the term "lifestyle spending" refers to that portion of spending during retirement which varies as a function of whether the retiree is in the active phase, slow down phase or passive phase of retirement. "Lifestyle spending" is distinguished from "basic needs spending." Herein, the term "basic needs spending" refers to that portion of spending which, absent financial difficulties, tends to be relatively constant regardless whether the retiree is in the active phase, slow down phase or passive phase of retirement. Lifestyle spending and basic needs spending are both distinguished from health-related spending. "Health-related spending" refers to spending that is motivated or necessitated by health reasons. Examples of health-related spending include spending for medical care including hospitalization, prescriptions, treatments, long term care, and so on. As will be appreciated, the dollar value cutoff between basic needs spending and lifestyle spending may vary from retiree to retiree.

In the active phase, even after basic living needs have been met, the marginal utility of money remains high because money can be spent in a variety of different ways which bring enjoyment to the retiree. During the slowing down phase, the retiree is assumed to be less active. The retiree still engages in activities such as travel, entertainment, sports, and so on, but not to the same extent as during the active years, and so retirement spending decreases. After basic living needs have been met, the marginal utility of money decreases because the retiree has fewer options for spending money. During the passive phase, the retiree is assumed to be relatively inactive, engaging in significantly smaller number of the activities that the retiree engaged in during more active years. In the passive phase, once basic living needs have been met, it is assumed that the marginal utility of money is relatively low.

In FIG. 2, by way of example, the active phase is shown to be from age 65 to age 75, the slowing down phase is shown to be from age 75 to age 85, and the passive phase is shown to be from age 85 and beyond. Transition ages for the different phases are shown to be age 75 and age 85. It will be appreciated that the ages at which an individual is assumed to be in each of the phases may be defined differently from individual to individual. Those individuals that are in better health may be able to enjoy an active lifestyle for a longer period of time.

As previously mentioned, absent financial difficulties, basic needs spending tends to be relatively constant. In the event of financial difficulties, however, many retirees may find ways to further reduce spending, if necessary. That is, if the retiree's investments perform poorly, a retiree may decide to cut back in one or more ways in order to reduce basic needs spending. As will be described in greater detail below, in creating retirement plan 20, a "worst case scenario" basic needs spending level may be defined. As used herein, "worst case scenario" refers to a scenario in which retirement investments perform at worst case levels. For example, in modeling/predicting performance of the retirement plan 20 at worst case levels, Great Depression era data or other historical data from periods of poor market performance may be used. The worst case scenario basic needs spending level is less than the "normal" basic needs spending level (i.e., that which would be used assuming investments perform at better than worst case levels). For example, in defining worst case scenario basic needs spending, a retiree may decide that the retiree would be willing to move to less expensive housing (e.g., move to a smaller house or condominium), spend less money dining out (e.g., by not dining out as much), to drive a less expensive car (e.g., drive a compact car that gets better gas mileage as compared to a luxury car), and/or to wear less expensive clothing (e.g., off the rack clothing instead of designer clothing). In these situations, the retiree is giving up things which bring enjoyment, even in the passive phase of retirement, so the marginal utility of the money that is given up in a worst case scenario is non-zero. However, by defining a worst case scenario basic needs spending level which is less than a normal basic needs spending level, the retiree creates the opportunity to take on additional risk. This, in turn, creates the opportunity for greater investment returns.

Figure 3:
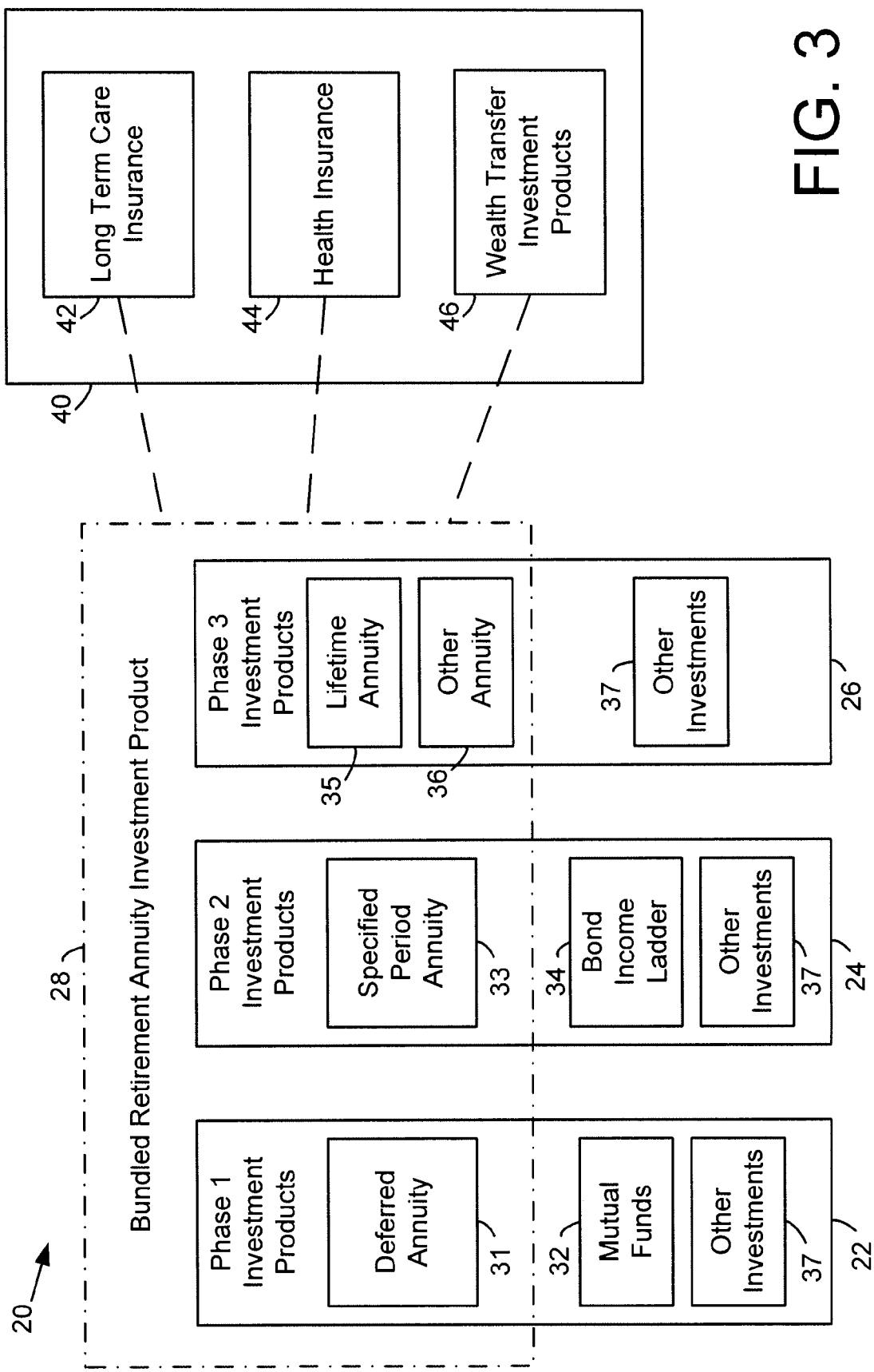
FIG. 3 is a retirement plan generated by the system of FIG. 1.
Figure 4:
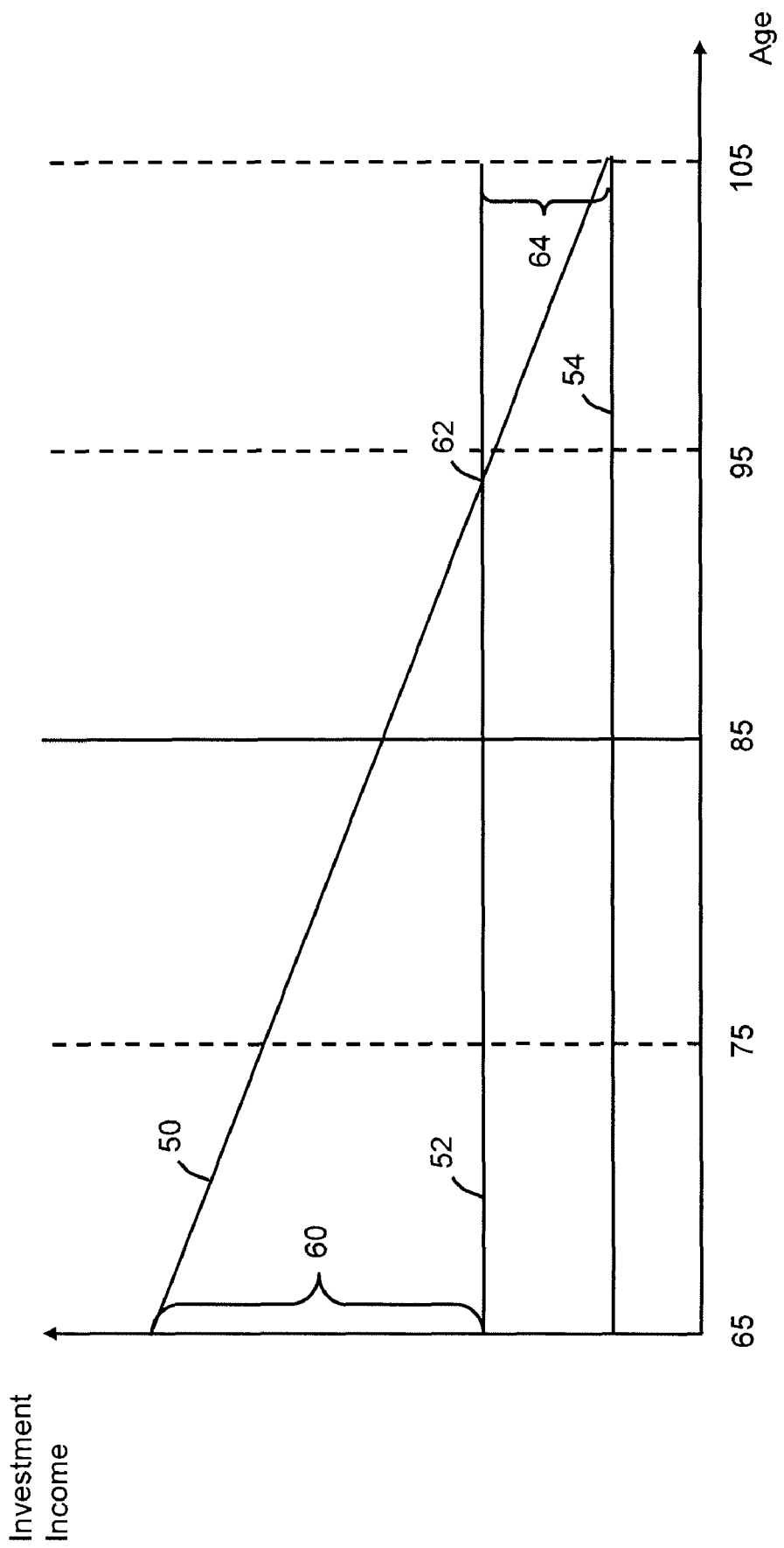
FIG. 4 is a graph showing model retirement income generated by the retirement plan of FIG. 3.

Referring now to FIGS. 3-4, a retirement plan 20 is shown that may be generated using the system of FIG. 1 and that reflects the considerations of FIG. 2. The retirement plan 20 comprises a series of investment mixes 22, 24, and 26 which correspond to different phases of retirement. Investment mixes 22-26 may comprise various investments such as deferred annuities 31, mutual funds 32, specified period annuities 33, bond income ladders 34, lifetime annuities 35, other annuities 36, and other investments 37, as will be described in greater detail below. Other investments 37 may include pension income or other assets which the retiree intends to use for retirement. Investment mixes 22, 24, and 26 may be configured to reflect different assumptions about risk tolerance of the retiree, income needs, and so on. Again, while three phases are shown, it will be appreciated that a different number of phases may be used.

Retirement plan 20 also includes a number of additional investments 40 configured to meet other investment goals. Investments 40 include long term care insurance 42, health insurance 44, and wealth transfer investment products 46. Long term care insurance 42 and health insurance 44 are configured to pay for long term care and health care costs of the retiree. Accordingly, investment mixes 22-26 provide income for daily living expenses and other personal spending, and are not needed to pay long term care and health care costs of the retiree. Likewise, investment products 46 are configured to allow the retiree to transfer wealth after passing away. For example, the retiree may want to provide an inheritance for heirs such as children or grandchildren, or may want to donate to a church, college, other charitable organizations, and so on. Investment products 46 may comprise life insurance, stocks, mutual funds, or other suitable investments.

By separating long term insurance 42, health insurance 44, and wealth transfer investment products 46 as separate investments, the risk-benefit analysis for goals associated with these investments may be performed separately. For example, a retiree that has a goal of providing an inheritance to children or grandchildren may configure the investments to reflect the risk tolerance of the intended beneficiaries, which may be more aggressive than the risk tolerance of the retiree. At the same time, for the assets intended to meet the retiree's own future retirement needs, the retiree may configure at least a portion of the investments to have a more conservative risk profile.

Referring now to FIG. 4, a graph is depicted showing income that may be generated by retirement plan 20 according to one model scenario. In the scenario of FIG. 4 (and FIGS. 9-12, discussed below), a moderate risk tolerance level is assumed, although it will be appreciated that the teachings herein may be applied for more conservative and more aggressive risk profiles. Each of the curves in FIG. 4 is inflation-adjusted. Curve 50 shows income generated by retirement plan 20 as a function of time. Curve 52 shows for comparison purposes income that would be generated by the same amount of assets if the assets were used to generate income in a time-invariant fashion (that is, if the retiree received the same amount of inflation-adjusted income each year throughout retirement). Curve 54 shows the level of income needed to provide for worst case scenario basic needs spending.

As shown in FIG. 4, retirement plan 20 generates greater income in early years, that is, during the active phase when the marginal utility of money is the highest. Brace 54 shows the difference in income in early retirement between the income generated by retirement plan 20 and the income that would be generated if the income were generated in time-invariant fashion. Retirement plan 20 steadily generates less income as time passes. At point 62, the amount of income generated by retirement plan 20 drops below the amount of income that would be generated if the income were generated in time-invariant fashion. When the retiree reaches age 105, the income generated by retirement plan 20 has dropped sufficiently such that it is only able to satisfy the basic needs spending of the retiree. Brace 56 shows the difference in income in late retirement. At age 105, however, the marginal utility of money of the retiree is substantially less than during the early years of retirement, and may even be zero considering the fact that the retiree also has long term care insurance and health insurance.

For those retirees that have accumulated retirement savings in excess of what is needed to provide for basic needs spending, retirement plan 20 provides a way to maximize the benefit from those savings. The system is configured to maximize the benefit the retiree receives from the retiree's retirement assets by configuring retirement income to reflect the retiree's estimated marginal utility of money. The retiree has more money to spend during early years of retirement. Although the retiree has less money to spend during later years of retirement, the retiree derives less benefit from the money in the later years anyway. Also, statistically, the retiree stands a 50% chance of passing away before age 85. For those retirees that die before age 85, more benefit is derived by spending additional money before age 85 is reached.

Reports provided by report generation logic 16 may include information concerning how the retirement income varies in accordance with the marginal utility of money. For example, the reports may include text concerning various phases of retirement and the levels of activity in each phase. As yet another alternative, the reports may include information indicating how the relative levels of enjoyment derived from money may vary throughout retirement. As yet another alternative, the reports may include information describing the amount of money that is budgeted for lifestyle activities during early years of retirement (e.g., discretionary travel, entertainment, recreational activities, dining out, and so on).

Figure 5:
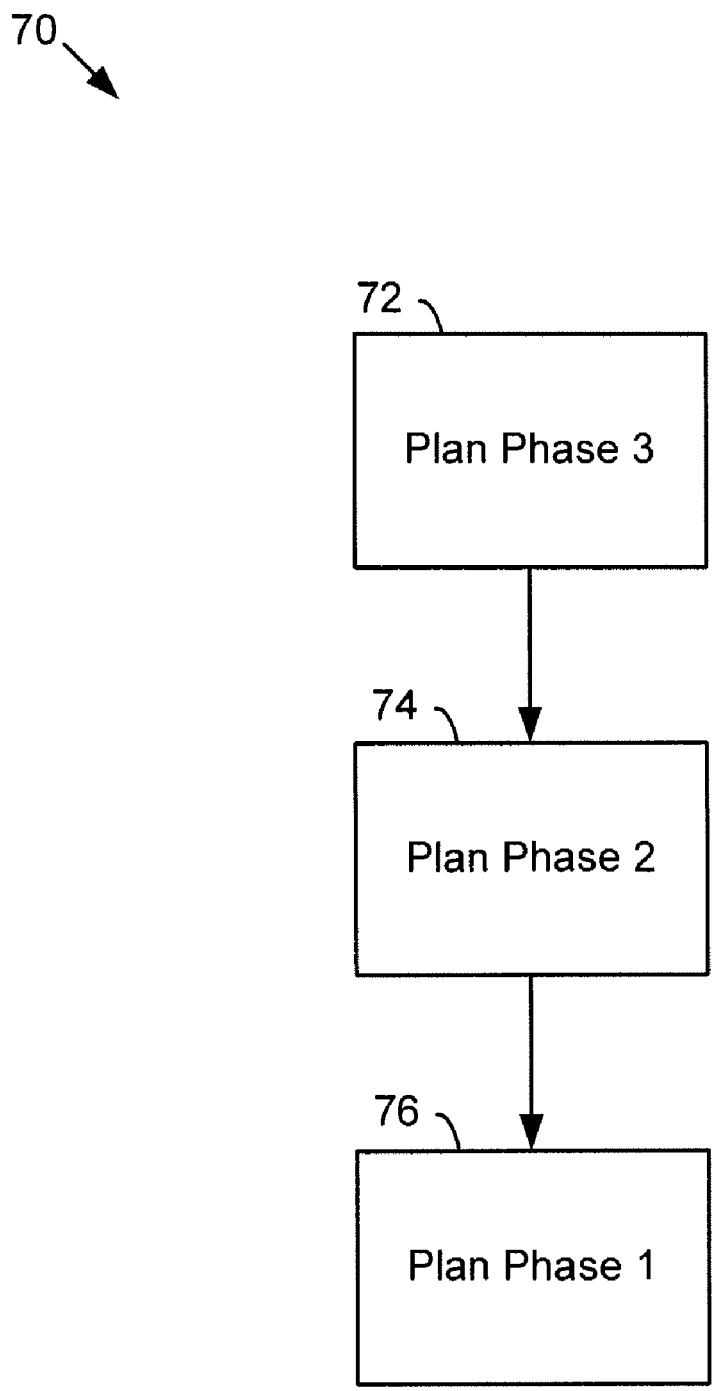
FIG. 5 is a retirement planning process implemented by the system of FIG. 1.

Referring now to FIG. 5, a retirement planning process 70 which may be performed using retirement planning system 10 and which may be used to generate retirement plan 20 is shown. In an exemplary embodiment, retirement planning process 70 starts (at step 72) with the final phase of retirement and solves the risk-based need of outliving retirement assets beyond age 85. In order to meet this goal, retirement plan 20 positions the retiree to purchase a lifetime annuity at the beginning of phase 3. A lifetime annuity provides payments for the lifetime of the retiree, and stops providing payments when the retiree dies. Typically, a lifetime annuity is configured as a risk-pooling arrangement in which benefits to individuals that live longer are funded by those that die early. Due to risk-sharing, lifetime annuities have an asset-multiplying effect. Various types of lifetime annuities exist, including annuities in which income is received over the lifetime of a single person, and joint and survivor lifetime annuities in which income is received over the lifetime of two persons. With the purchase of a lifetime annuity, the retiree is guaranteed an income stream for the remainder of the retiree's life.

Preferably, the retirement plan 20 allocates enough money for the purchase of the lifetime annuity such that the lifetime annuity provides an income stream that is adequate to meet the basic needs spending of the retiree for the remainder of the retiree's life. In order to determine the amount of money that the retiree should have on-hand at the beginning of phase 3 to purchase a lifetime annuity, the worst case scenario basic needs level of income that the retiree would like to receive during phase 3 of retirement is determined. The worst case scenario assumes that the investments perform at worst case levels (at or below long term historical lows, e.g., at "Great Depression" levels of performance) during intervening years. To determine this amount, as part of the retirement planning process, data collection logic 12 may be configured to pose questions to determine the level of income that meets the retiree's worst case scenario basic needs spending.

Referring now to FIGS. 6-7, screen displays 82 and 84 are shown that may be used to elicit information concerning what the retiree considers to be worst case scenario basic needs spending. As will be appreciated, the screen displays may be formatted in a variety of different ways. As shown in FIGS. 6-7, the user may be presented with a variety of different questions which ask the retiree to provide quantitative answers or to select from predefined qualitative answer choices (e.g., "Yes" or "No"). The worst case scenario basic needs spending amount may be determined by starting with budget information for the early years of retirement, and then estimating the retiree's worst case scenario basic needs spending by adjusting spending levels in accordance with the answers provided by the retiree. Once the adjustments have been made, data collection logic 12 may present the retiree with the worst case scenario basic needs spending information, and ask for confirmation that the amount calculated accounts for all of what the retiree considers to be needed and is otherwise considered by the retiree to be appropriate.

In determining the amount of income that needs to be generated by the lifetime annuity, other assumptions are also made. For example, such assumptions may include that the retiree will not live beyond a particular maximum life expectancy (in FIG. 4, age 105), assumptions about average inflation rates, and so on. As will be appreciated, these other assumptions also introduce uncertainty in the calculations for determining how much money to allocate for a lifetime annuity. Accordingly, to determine the retiree's risk tolerance in connection with phase 3 income, as part of the retirement planning process, data collection logic 12 may be configured to pose questions to determine the retiree's tolerance for risk in connection with the prospect that the retiree's income may be less than what is needed to meet worst case scenario basic needs spending due to erroneous assumptions about inflation, longevity, etc. FIG. 8 shows a screen display which includes examples of such questions.

Based on the above information, the cost of a lifetime annuity that can be purchased at the beginning of phase 3 and that will provide income at least sufficient to meet worst case scenario basic needs spending until age 105 is determined. In turn, based on the cost of the lifetime annuity at the beginning of phase 3, the amount of money that needs to be invested at the beginning of phase 1 to yield enough money at the beginning of phase 3 to purchase the lifetime annuity may be determined. This amount of money may then be set aside (i.e., invested) to fund the lifetime annuity component of the retirement plan 20. The type of investments that may be made may vary depending on whether the retiree wishes to be conservative, moderate, or aggressive in their assumptions about investment performance.

In an exemplary embodiment, the lifetime annuity is funded with a deferred annuity which is purchased at the beginning of phase 1. The deferred annuity may comprise an annuitization payout option which allows the individual to exchange the value of the deferred annuity for the issuing company's guarantee to make payments to the retiree for the retiree's lifetime. The deferred annuity preferably has a guaranteed minimum settlement rate. The guaranteed minimum settlement rate is an interest rate at which payments are made under the annuitization payout option. It is "guaranteed" in that, if settlement rates currently offered at the time the annuitization payout option is exercised are less than the guaranteed minimum settlement rate, the retiree has the option to select the guaranteed minimum settlement rate to receive a higher payout. The deferred annuity may also have other features, such as a guaranteed minimum death benefit.

Although retirement plan 20 positions the retiree to purchase a lifetime annuity at the beginning of phase 3, in practice, the retiree may or may not ultimately decide to purchase the lifetime annuity when the time comes. Depending on the retiree's circumstances, the retiree may or may not need a lifetime annuity at the beginning of phase 3. As previously noted, the lifetime annuity allows people to participate in risk pooling, which allows a smaller amount of assets to last a longer period time if needed. However, if the retiree's investments have performed very well, the retiree may decide to defer indefinitely the purchase of a lifetime annuity, and potentially pass on remaining wealth to heirs, rather than losing it to other participants in the aforementioned risk-sharing arrangement. Alternatively, if the retiree is in poor health by the time age 85 is reached, and does not expect to outlive the retiree's assets, the retiree may decide not to purchase a lifetime annuity, and pass on remaining wealth to heirs. Alternatively, the retiree may prefer to have inflation-adjustment income. For example, if a deferred annuity is purchased as mentioned above, the retiree may select between an annuitization option (i.e., lifetime annuity) and taking inflation adjusted withdrawals. If the inflation adjusted withdrawal option is selected, the income stream is adjusted for inflation but there is no lifetime payment guarantee.

Figure 9:
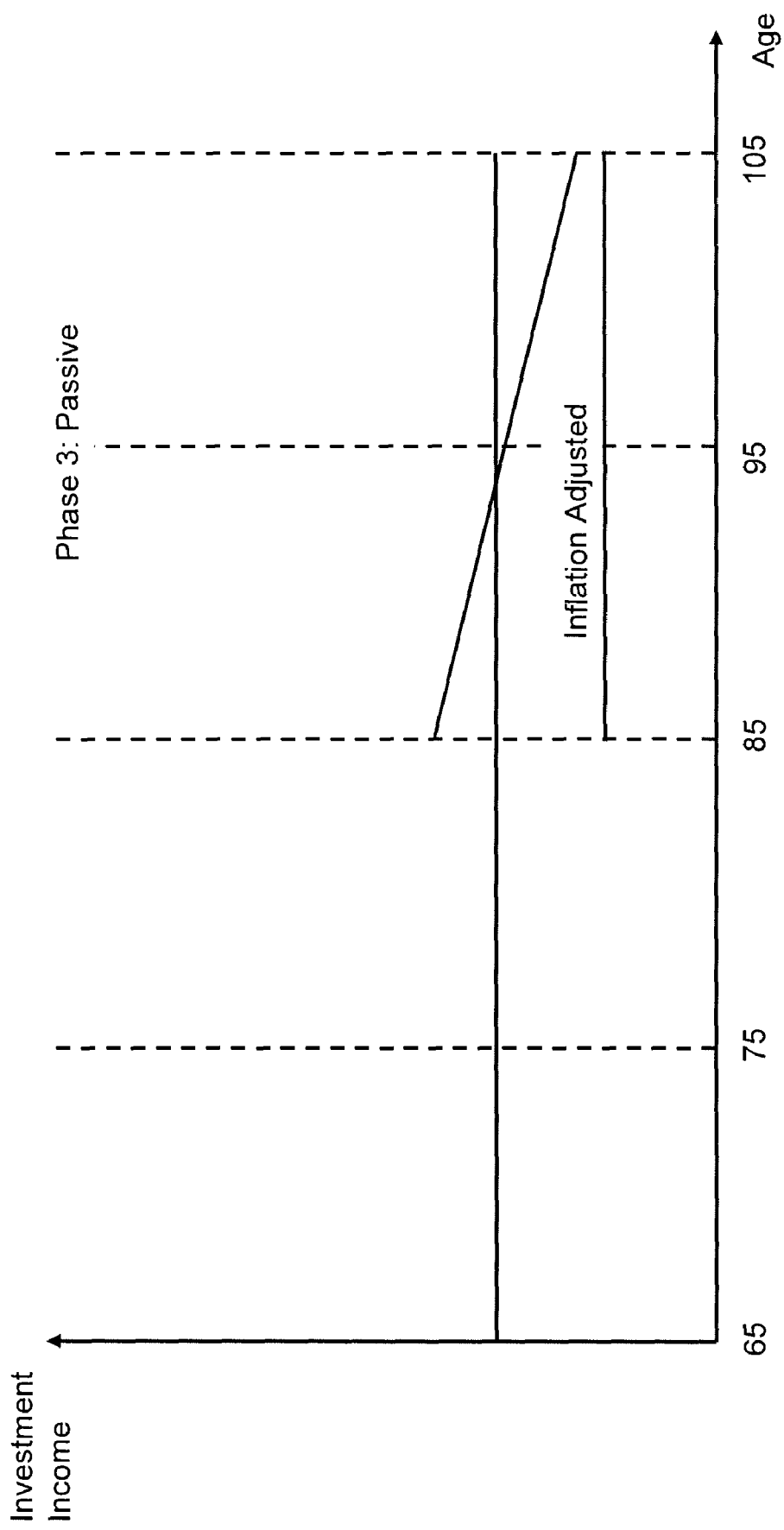
FIGS. 9-11 are graphs showing hypothetical retirement income generated during different phases of by the retirement plan of FIG. 3.

FIG. 9 shows a hypothetical income stream received by the retiree during phase 3. Although the discussion above has been phrased in terms of one lifetime annuity, in practice, it will be appreciated that multiple lifetime annuities may be purchased. Purchasing multiple lifetime annuities prevents the retiree from locking in an unduly low interest rate.

Figure 10:
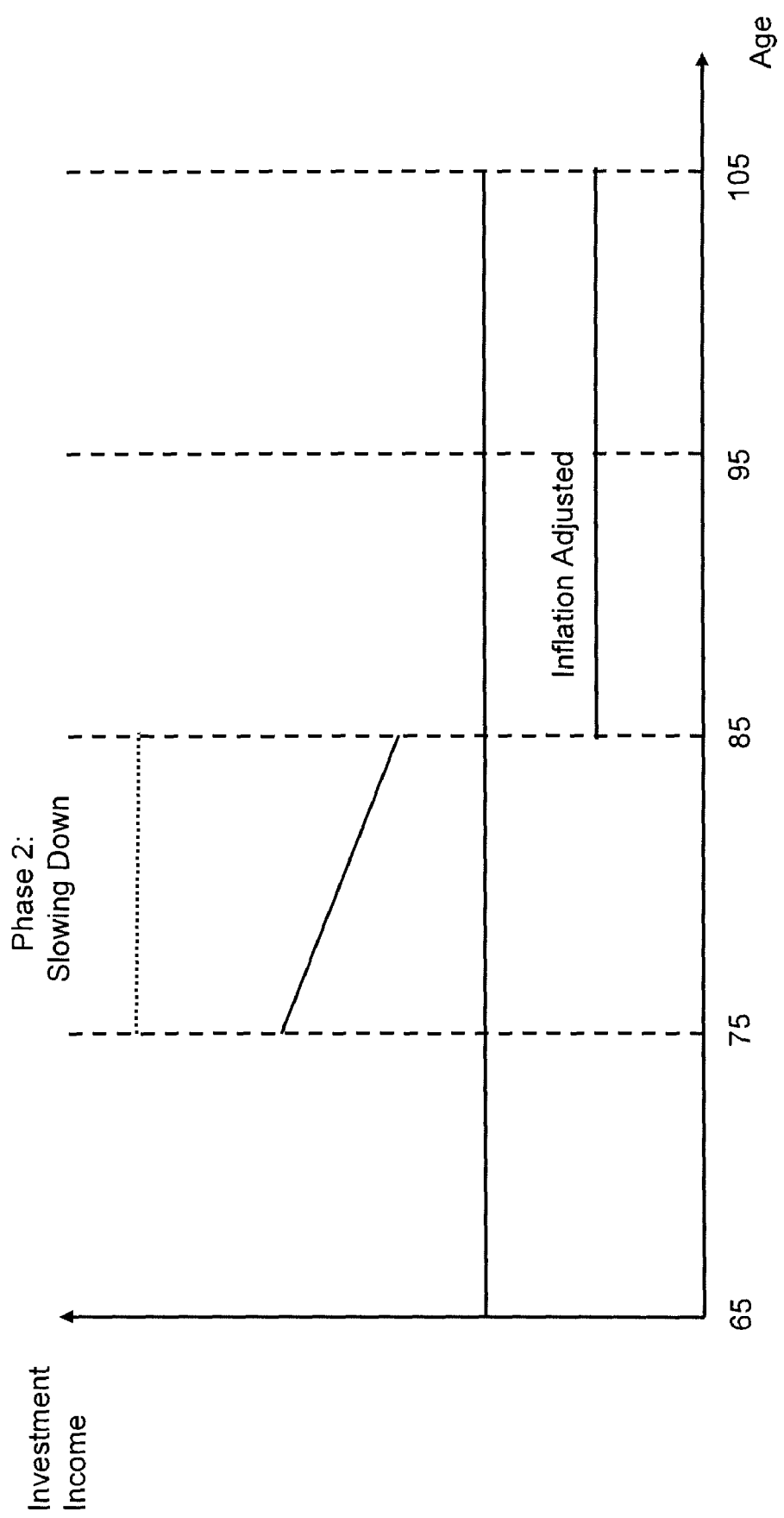

After parameters of the retirement plan 20 have been determined (e.g., the amount of money that is needed to fund a lifetime annuity in phase 3), retirement planning process 70 works backwards and plans phase 2 and 1. FIG. 10 shows a hypothetical income stream received by the retiree during phase 2. For phase 2, the retirement plan 20 uses an income bridge to provide income for the retiree from age 75 to age 85. Again, the retiree may work backwards by determining how much income is desired during phase 2 and determining how much money will be needed to fund the phase 2 income bridge at the beginning of phase 2. The income bridge may be implemented using a specified period annuity, bond income, and/or other investments. With a specified period annuity, the retiree receives fixed income for a specified period of time, and benefits stop at the end of the specified period. Money to fund phase 2 retirement income is likely to be funded from qualified assets (e.g., 401(k) plans) and non-qualified assets (e.g., mutual funds).

Figure 11:
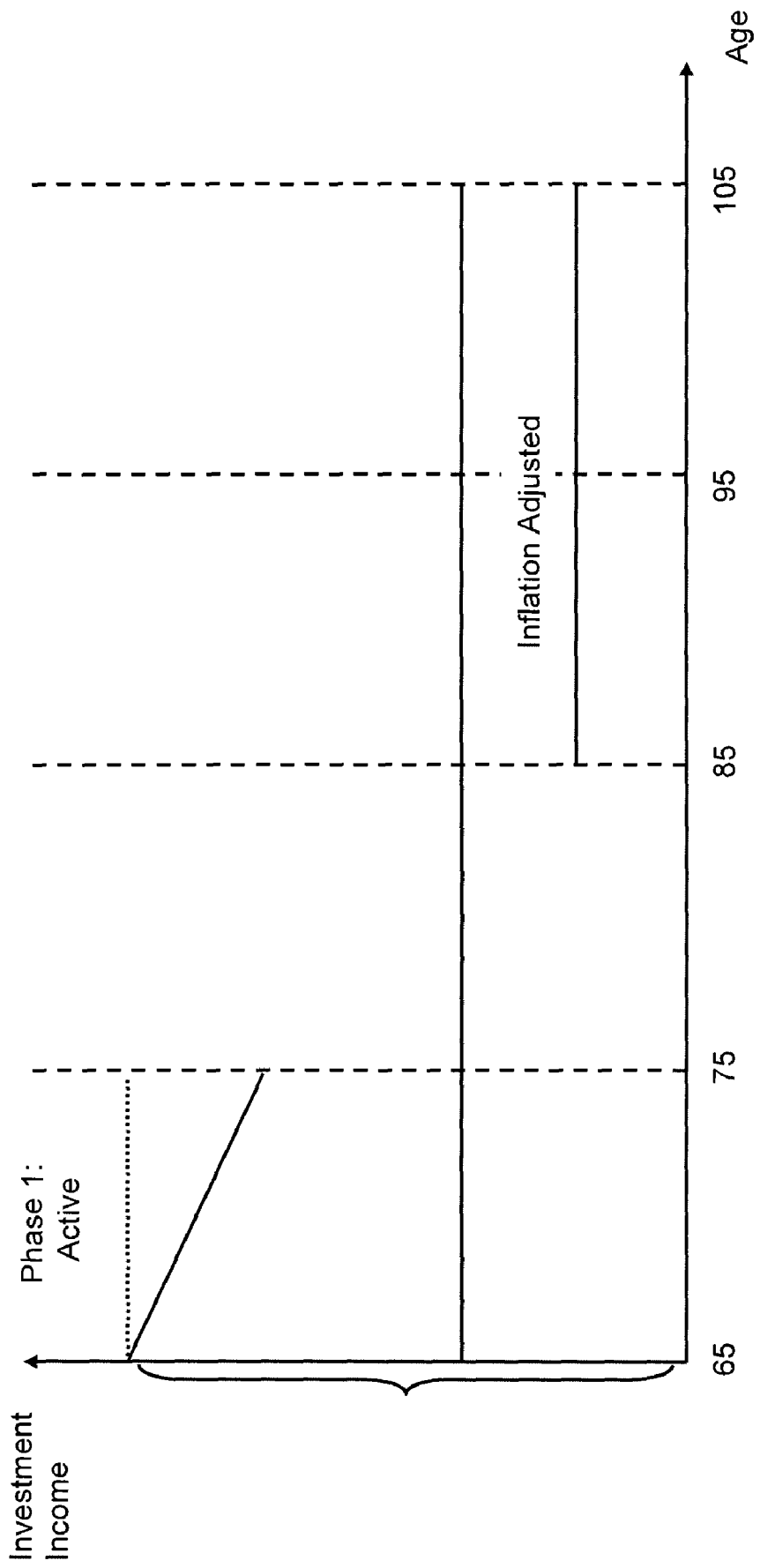
Figure 12:
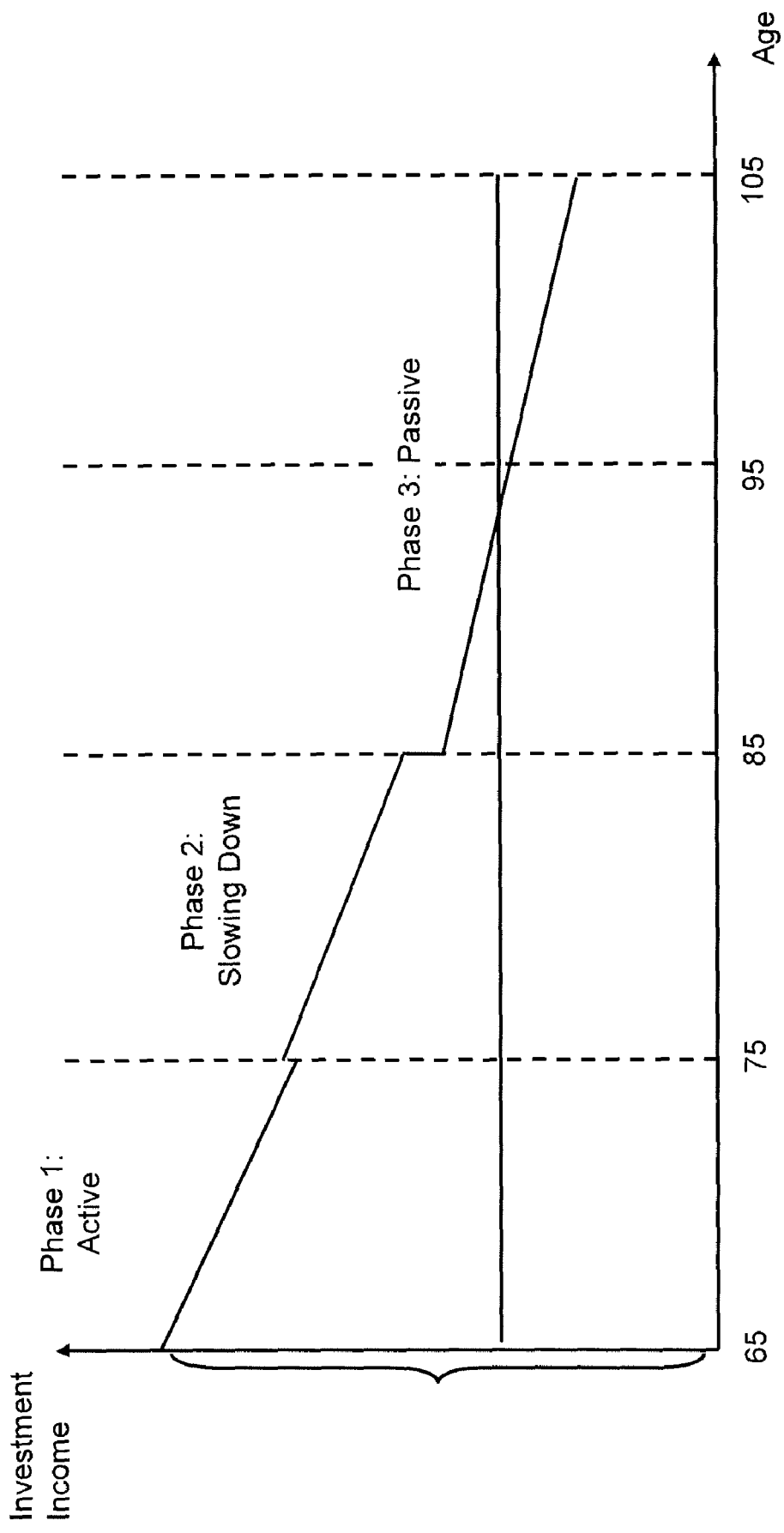
FIG. 12 is a graph combining the graphs shown in FIGS. 9-11.

FIG. 11 shows a hypothetical income stream received by the retiree during phase 1. During phase 1, the retiree may decide to purchase a deferred annuity. With a deferred annuity, the investor has an option to receive a lump sum payment at the end of the annuity term. The retiree may also decide to invest in mutual funds or other investments. As will be appreciated, retirement planning process 70 may be iterative. That is, different scenarios for phase 1, 2 and 3 may be tested until an appropriate income/risk arrangement is reached. Additionally, investment performance and other assumptions that were factored into constructing retirement plan 20 may be revisited from time to time, such that retirement plan 20 may be updated. Desired income levels during various phases may be adjusted until an arrangement as shown in FIG. 12 is reached. In FIG. 12 income gradually decreases as the retiree gets older, without significant changes income as the retiree moves from one phase to the next phase. FIG. 12 is similar to FIG. 4, except that it shows various minor discontinuities associated with transitions from one phase to the next result from investment performance.

The retirement planning process is preferably performed no later than when the retiree is at retirement age or, preferably, several years before. Retirement plan 20 preferably includes a seamless transition from qualified plan to deferred annuity to specified period annuity to lifetime annuity. All phases may be funded from qualified and unqualified assets. For example, pension income and other sources of income may also be factored in throughout each of the phases, if applicable.

By way of example, in the first year of retirement (e.g., at age 65), the worst case scenario basic needs spending amount may be determined, as described above in connection with FIGS. 6-7. A multiple of this amount (e.g., 4× this amount) is set aside and invested in accordance with the retiree's risk tolerance as described above in connection with FIG. 8. Then, a portion of the remaining asset balance may be invested in relatively conservative investments to fund phase 1 retirement and a remaining portion may be deferred and invested in more aggressive investments. For example, a moderately conservative investor may invest in 60% fixed income to fund phase 1 retirement income and may invest the remaining 40% in a more aggressive mix of investments to fund additional phase 2 and phase 3 retirement income. Because the investment horizons for phases 2 and 3 are quite long (10 years and 20 years at age 65, respectively), the money used to fund phases 2 and 3 may more appropriately be invested in more aggressive (higher risk, higher potential yield) investments. Small cap funds may be more volatile and more risky than large cap funds in the short term, but present more opportunity for high growth, especially when invested in over the long term. Over long periods of time, the probability of getting a high rate of return increases. By way of example, in addition to the 60% invested in fixed income for phase 1, 30% may be invested in large cap funds, and 10% may be invested in small cap funds for phases 2 and 3. Other aggressive mixes of investments may also be used. For example, for the remaining 40% for phases 2 and 3, 40% may be invested in large cap funds, 30% may be invested in small cap funds, and 30% may be invested in international funds. In one embodiment, the annual income from the phase 1 income bridge is capped at 7% of the original assets in order to prevent a higher-than-expected level of inflation from causing the retiree to spend too much in the early years of retirement. At age 75, the retiree moves more money to fixed income and large cap funds (e.g., 75% fixed income, 19% large cap funds and 6% small cap funds), reflecting a shorter investment horizon. The retiree may continue to defer the age 85 set aside, including earnings and remaining balance. Again, other mixes of investments may be used, including mixes which include international funds. At age 85, the retiree's financial position is evaluated to determine whether to annuitize for a lifetime income and, if so, what percentage to annuitize. In a worst case scenario, the retiree may invest in 100% fixed income.

Figure 13:
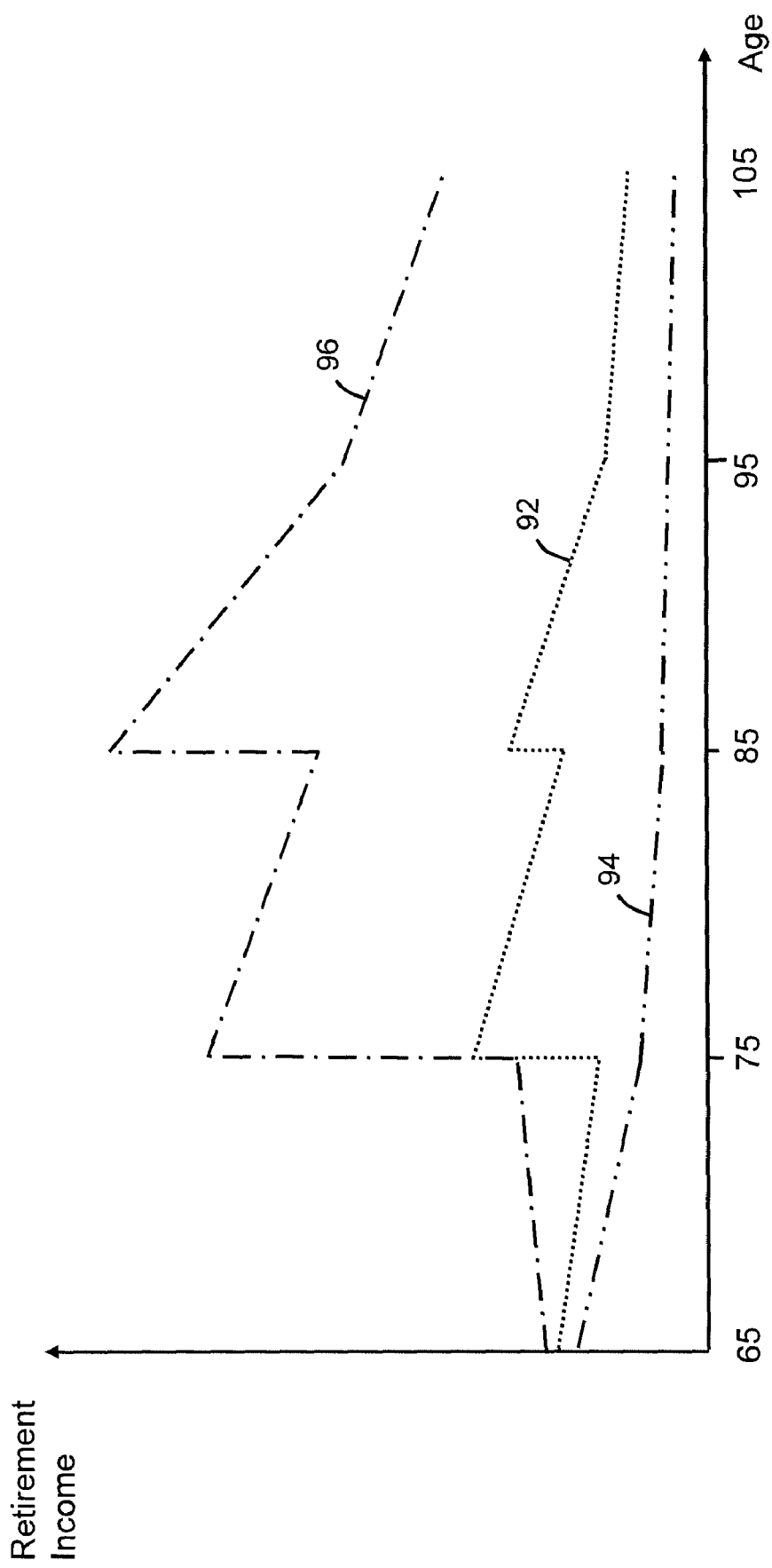
FIG. 13 is a graph showing a range of outcomes that may be achieved by the retirement plan of FIG. 3.

As shown in FIG. 13, depending on the performance of the retiree's assets, different ranges of outcomes are possible. Curve 92 shows a median case outcome, curve 94 shows a worst case outcome, and curve 96 shows a best case outcome. In the worst case scenario, curve 94, it is likely that the retiree will purchase a lifetime annuity at age 85 to provide for worst case scenario basic needs spending. In the best case scenario, curve 96, the retiree's investments have performed very well and the retiree is unlikely to purchase a lifetime annuity. The retiree's basic spending and then some are more than adequately met by returns on investments.

In FIG. 3, it may be noted the investment mixes 22-26 each include one or more annuity products. In one embodiment, the annuity products in investment mixes 22-26 are bundled to form a single product 28 which may be purchased by the retiree and which incorporates the different features of the individual annuity products. Annuity product 28 may include combinations of opt-out and opt-in provisions in order to provide the retiree with the flexibility offered by purchasing the annuity products individually as well as the convenience of purchasing them in bundled form. Long term care insurance 32, health insurance 34, and/or wealth transfer investment products 36 may also be bundled and included in product 28, if desired.

Exemplary embodiments have been described with reference to drawings. However, describing with drawings should not be construed as imposing any limitations that may be present in the drawings.

As noted above, embodiments within the scope of the present disclosure include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments may be practiced in a networked environment using logical connections to one or more remote computers having processors. Logical connections may include a local area network and a wide area network. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include volatile and non-volatile memory including optical and magnetic disk drives for short and long term storage. The drives and their associated machine-readable media provide nonvolatile storage of machine-executable instructions, data structures, program modules and other data for the computer.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments has been presented for purposes of illustration and description. It is not intended to be exhaustive or to limit the invention to the precise form disclosed, and modifications and variations are possible in light of the above teachings or may be acquired from practice of the subject matter disclosed herein. The embodiments were chosen and described in order to explain the principals of the invention and its practical application to enable one skilled in the art to utilize the invention in various embodiments and with various modifications as are suited to the particular use contemplated.

What is claimed is:

1. A computer-implemented retirement planning system, comprising:
    data collection logic implemented by machine-executable instructions stored in a machine-readable storage medium and a processor that executes the instructions, the data collection logic being configured to receive data pertaining to an individual planning for retirement and to present questions configured to elicit information useable to ascertain what the individual planning for retirement considers to be a worst case scenario basic needs level of income;
    retirement modeling logic implemented by the machine-executable instructions stored in the machine-readable storage medium and the processor that executes the instructions, the retirement modeling logic being configured to process the data to generate parameters of a retirement plan based on the worst case scenario basic needs level of income, the retirement plan comprising a series of phases in which the individual becomes successively less active in each phase, the retirement plan comprising a retirement income arrangement in which the amount of inflation-adjusted retirement income from sources other than long term care insurance and health insurance is larger during early years of the retirement plan and decreases as the maximum life expectancy of the individual is reached; and
    report generation logic implemented by the machine-executable instructions stored in the machine-readable storage medium and the processor that executes the instructions, the report generation logic being configured to generate a retirement plan report describing the retirement income arrangement.

2. The system of claim 1, wherein the retirement plan is configured to vary the amount of inflation-adjusted retirement income provided to the individual in accordance with an estimated marginal utility of money for the individual during the retirement.

3. The system of claim 2, wherein the retirement plan report is configured to provide the individual with information describing how the amount of inflation-adjusted retirement income varies in accordance with the estimated marginal utility of money for the individual during the retirement.

4. The system of claim 1, wherein the retirement income steadily decreases towards a basic needs level as the maximum life expectancy of the individual is reached.

5. The system of claim 1, wherein the retirement plan report presents a comparison of the amount of inflation-adjusted retirement income received by the individual under the retirement plan with the amount of inflation-adjusted retirement income that would be received by the individual from the same starting retirement assets if the income were generated in an inflation-adjusted but otherwise time-invariant fashion.

6. The system of claim 1, wherein the amount of inflation-adjusted retirement income from sources other than long term care insurance and health insurance is at least two times as large during the early years of the retirement plan as compared to when the maximum life expectancy of the individual is reached.

7. The system of claim 1, wherein the amount of inflation-adjusted retirement income from sources other than long term care insurance and health insurance is at least three times as large during the early years of the retirement plan as compared to when the maximum life expectancy of the individual is reached.

8. The system of claim 1, wherein the data collection module is configured to present questions configured to elicit information concerning the individual's tolerance for risk in connection with the prospect of receiving an amount of income which is less than the worst case scenario basic needs level as the maximum life expectancy of the individual is reached.

9. A computer-implemented retirement planning system, comprising:
report generation logic implemented by machine-executable instructions stored in a machine-readable storage medium and a processor that executes the instructions, the report generation logic being configured to generate a retirement plan report describing a retirement plan for an individual, the retirement plan comprising a series of phases in which the individual becomes successively less active in each phase, and the retirement plan report describing a retirement income arrangement for the retirement plan in which inflation-adjusted income allocated for lifestyle spending varies in accordance with an estimated marginal utility of money of the individual during retirement;
data collection logic implemented by the machine-executable instructions stored in the machine-readable storage medium and the processor that executes the instructions, the data collection logic being configured to receive data pertaining to an individual planning for retirement, the data collection logic being configured to present questions configured to elicit information concerning what level of income the individual considers to be a worst case scenario basic needs level of income and being configured to elicit information concerning the individual's tolerance for risk in connection with the prospect that actual retirement income during a final phase of retirement may be less than the worst case scenario basic needs level of income; and
retirement modeling logic implemented by the machine-executable instructions stored in the machine-readable storage medium and the processor that executes the instructions, the retirement modeling logic being configured to process the data to generate parameters of the retirement plan, the retirement modeling logic generating the parameters of the retirement plan based on the level of income the individual considers to be a basic needs level of income and based on the individual's tolerance for risk in connection with the prospect that the actual retirement income during the final phase of retirement will be less than the worst case scenario basic needs level of income, the retirement plan comprising a retirement income arrangement in which inflation-adjusted retirement income allocated for lifestyle spending is larger during early years of the retirement plan and decreases as the maximum life expectancy of the individual is reached.

10. The system of claim 9, wherein the retirement modeling logic is configured to generate the retirement plan by generating parameters for the final phase of retirement, and then working backwards based on the parameters for the final phase of retirement to generate additional parameters for earlier phases of retirement.

11. The system of claim 9, wherein the retirement plan report reflects a purchase of a deferred annuity.

12. The system of claim 11, wherein the deferred annuity comprises an annuitization payout option which allows the individual to exchange the value of the deferred annuity for the issuing company's guarantee to make payments to the individual for the individual's lifetime.

13. The system of claim 12, wherein the deferred annuity has a guaranteed minimum settlement rate, the guaranteed minimum settlement rate being an interest rate at which payments are made under the annuitization payout option, wherein, if settlement rates currently offered at the time the annuitization payout option is exercised are less than the guaranteed minimum settlement rate, the individual has the option to select the guaranteed minimum settlement rate to receive a higher payout.

14. The system of claim 10, wherein the deferred annuity has a guaranteed minimum death benefit.

15. The system of claim 9, wherein the retirement plan report reflects the purchase of long term care insurance and health insurance.

16. The system of claim 9, wherein the retirement plan report presents the series of phases to the individual as comprising an active phase, a slow down phase, and a passive phase.

17. The system of claim 9, wherein the series of phases comprise at least three phases, and wherein the retirement plan calls for spending at least 60% of retirement assets available at the beginning of the first phase during the first phase.

18. The system of claim 9, wherein the retirement plan report is configured to present the individual with income information based on an assumption that the individual receives a lifetime annuity during the last phase of the series of phases.

19. A computer-implemented retirement planning method, comprising:
receiving, by data collection logic implemented by machine-executable instructions stored in a machine-readable storage medium and a processor that executes the instructions, user inputs indicating a level of income an individual considers to be a worst case scenario basic needs level of income;
receiving, by the data collection logic, user inputs indicating the individual's tolerance for risk in connection with the prospect that actual retirement income during a final phase of retirement may be less than the worst case scenario basic needs level of income; and
generating, by retirement modeling logic implemented by the machine-executable instructions stored in the machine-readable storage medium and the processor that executes the instructions, a retirement plan based on (1) the worst case scenario basic needs level of income and (2) the individual's tolerance for risk in connection with the prospect that the actual retirement income during the final phase of retirement may be less than the worst case scenario basic needs level of income, wherein the retirement plan that is generated comprises a series of phases in which the individual becomes successively less active in each phase, and wherein the retirement plan that is generated comprises a retirement income arrangement in which the amount of inflation-adjusted retirement income from sources other than long term care insurance and health insurance is larger during early years of the retirement plan and decreases as the maximum life expectancy of the individual is reached.

20. The method of claim 19, wherein generating the retirement plan comprises generating parameters for the final phase of retirement, and then working backwards based on the parameters for the final phase of retirement to generate additional parameters for earlier phases of retirement.

21. The method of claim 19,
wherein the retirement plan is configured to vary the amount of inflation-adjusted retirement income provided to the individual in accordance with an estimated marginal utility of money for the individual during the retirement; and wherein the method further comprises generating a retirement plan report which describes the retirement plan, the retirement plan report being configured to provide the individual with information describing how the amount of inflation-adjusted retirement income varies in accordance with the estimated marginal utility of money for the individual during the retirement.

22. The method of claim 19,
wherein the retirement plan comprises a retirement income arrangement in which the amount of inflation-adjusted retirement income from sources other than long term care insurance and health insurance is at least twice as large during early years of the retirement plan as compared to the amount of inflation-adjusted income that is received as the maximum life expectancy of the individual is reached;

wherein the method further comprises generating a retirement plan report which describes the retirement plan, the retirement plan report being configured to provide the individual with information describing the decrease in the amount of inflation-adjusted retirement income throughout retirement; and wherein the retirement plan presents a comparison of the amount of inflation-adjusted retirement income received by the individual under the retirement plan with the amount of inflation-adjusted retirement income that would be received by the individual from the same starting retirement assets if the income were generated in an inflation-adjusted but otherwise time-invariant fashion.

\* \* \* \* \*